Aug. 8, 1950   A. N. STANTON   2,517,937
FISHING POLE HOLDER
Filed July 17, 1948
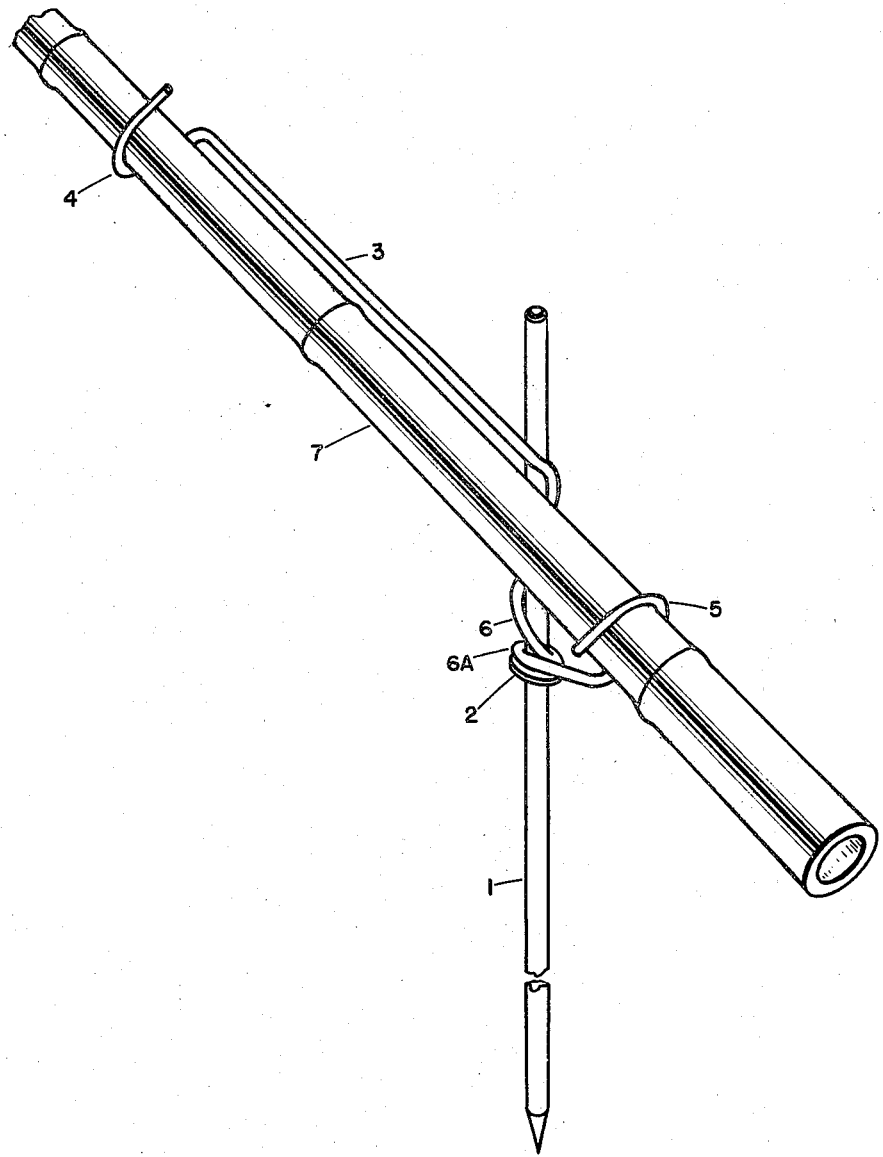
Austin N Stanton
INVENTOR.

Patented Aug. 8, 1950

2,517,937

UNITED STATES PATENT OFFICE 2,517,937

FISHING POLE HOLDER

Austin N. Stanton, Garland, Tex.

Application July 17, 1948, Serial No. 39,237

4 Claims. (Cl. 248—42)

1

It is the general practise of those who fish using a cane pole or some such similar device to hold the pole for the unexpected but much hoped for bite. This monotony is often times relieved by firmly but awkward-planting the pole in the bank of the stream, if the ground is not too hard. Many would-be catches are lost due to the task of extricating the pole from the bank. Many times the pole has been loosened just in time to have the fish tangle the line around a log or limb. Many anglers have longed for some means of mounting their poles easily and simply and so that the pole can be quickly detached for hand manipulation in case of a strike. They have wished for a device which could easily be disassembled and packed in the least amount of space.

The objects of my invention are to provide a device of the character mentioned, simple in construction, cheaply made and easily carried in a tackle box or otherwise while at the same time providing the angler with a pole holder easy to set up anywhere and from which the pole is easily and quickly removed.

The accompanying drawing illustrates the rod holder and its component parts and shows a short section of pole and how the latter is held within the device.

Part 1 is a rod or stake of convenient length sharpened on one end and having attached firmly a short distance from the opposite end a washer 2 which acts as a stop and provides a bearing surface for the circumferential part 6 of cradle 3. Cradle 3 is of smaller diameter than rod 1 and has at one end a U-shaped bend 4 curved downwardly to act as a rod support and another U-shaped bend 5 at opposite the end of said cradle curved upwardly to act as a pole retainer. The part 6 of cradle 3 is a spiral, and part 6a is a toroidal part of cradle 3 engaging rod 1 and bearing on the washer 2 thus enabling cradle 3 to be set on, removed or revolved around rod 1. 7 is a fishing pole not a part of my device, and shows the relative position of said pole in the cradle 3.

A deviation in construction as shown in the drawing might be made, without departing from my invention, in the substitution of a hollow cylindrical tube replacing the spiral portion of the cradle and still retaining the features of rotation around and removal of the cradle from the stake.

I claim the following as new:

1. A rod holder comprising: a standard having a lower end adapted to be pressed into the ground and a horizontally extending abutment positioned near the upper end of said standard; and a rod cradle comprising an intermediate portion provided with an opening to surround and loosely engage the upper end portion of said standard, said intermediate portion resting on said abutment, a forwardly and upwardly extending portion secured to said intermediate portion, an upwardly opening U-shaped portion extending laterally from said forwardly and upwardly extending portion, a rearwardly extending portion secured to said intermediate portion, and a downwardly opening U-shaped portion extending laterally from said rearwardly extending portion.

2. A rod holder comprising: a standard having a lower end adapted to be pressed into the ground and a horizontally extending abutment positioned near the upper end of said standard; and a single piece rod cradle comprising a coiled portion substantially surrounding and loosely engaging the upper end portion resting on said abutment, a forwardly and upwardly extending portion integral with said coiled portion terminating in an upwardly opening bight portion extending laterally from said forwardly and upwardly extending portion, and a rearwardly extending portion integral with said coiled portion and terminating in a downwardly opening bight portion extending laterally from said rearwardly extending portion.

3. A single piece rod cradle comprising a coiled portion provided with an opening, an outwardly and upwardly extending portion integral with said coiled portion terminating in an upwardly opening bight portion extending laterally from said outwardly and upwardly extending portion, and a second outwardly extending portion secured to said coiled portion and terminating in a downwardly opening bight portion, said outwardly extending portions extending in opposite directions from said coiled portion.

4. A rod cradle comprising a coiled portion provided with an opening, an outwardly and upwardly extending portion secured to said coil portion terminating in an upwardly opening bight portion extending laterally from said outwardly and upwardly extending portion, and a second outwardly extending portion secured to said coiled portion and terminating in a downwardly opening bight portion, said outwardly extending portions extending in opposite directions from said coiled portion, said coiled porton comprising an upper coil portion having a large pitch and a lower coil portion having a small pitch.

AUSTIN N. STANTON.

REFERENCES CITED

The following references are of record in the file of this patent:

UNITED STATES PATENTS

| Number | Name | Date |
|---|---|---|
| 1,537,237 | Kaestner | May 12, 1925 |
| 2,220,234 | Hadaway | Nov. 5, 1940 |
| 2,399,435 | Gregory | Apr. 30, 1946 |
| 2,426,881 | Johnson et al. | Sept. 2, 1947 |